Figure 1:
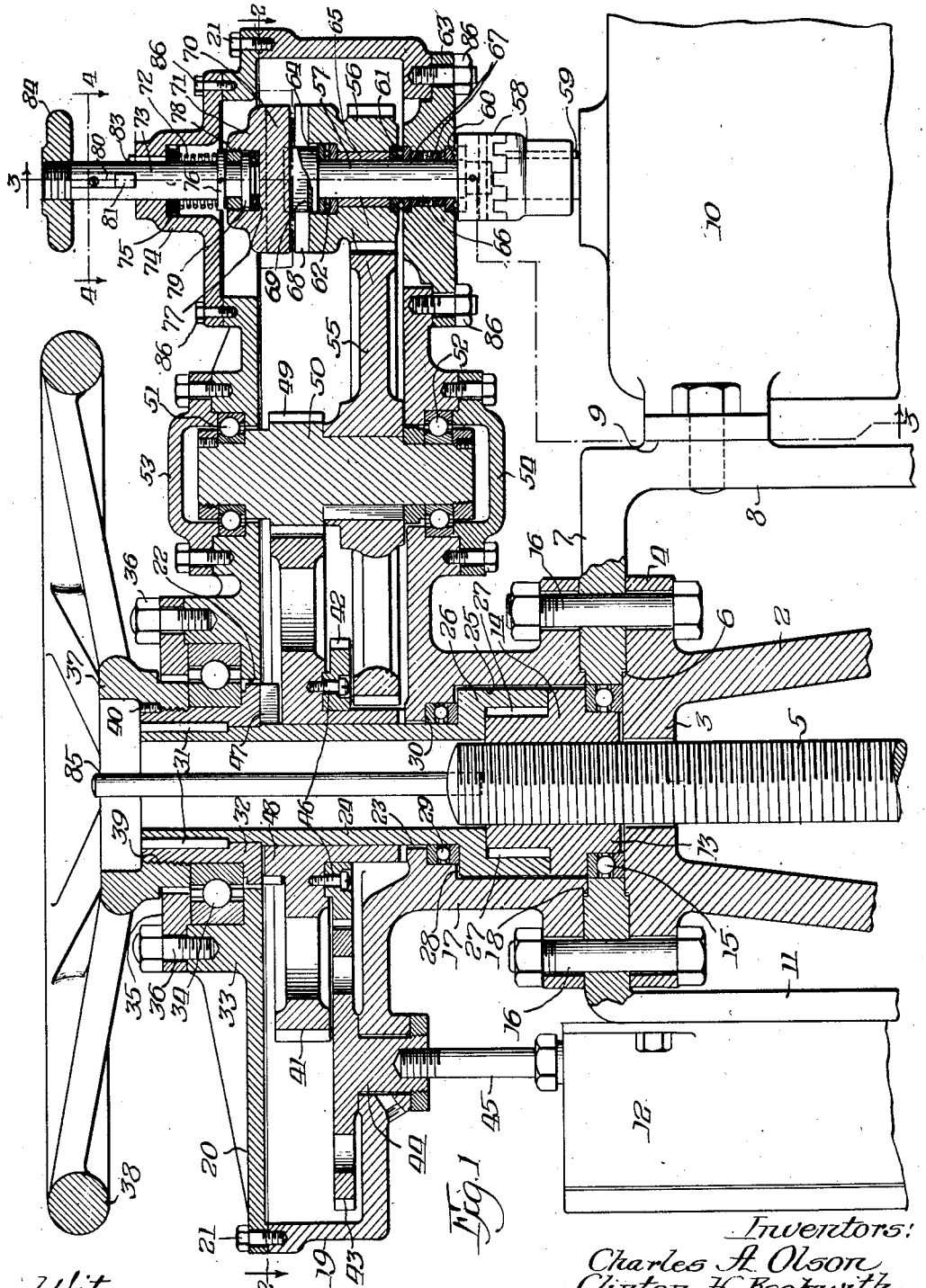

Nov. 19, 1929.  C. A. OLSON ET AL  1,736,417
MOTOR OPERATED VALVE UNIT
Filed Nov. 14, 1927   3 Sheets-Sheet 1

Inventors:
Charles A. Olson
Clinton H. Beckwith
By Ira J. Wilson
Atty.

Witness:
Geo. E. Davis

Nov. 19, 1929.  C. A. OLSON ET AL  1,736,417
MOTOR OPERATED VALVE UNIT
Filed Nov. 14, 1927  3 Sheets-Sheet 2
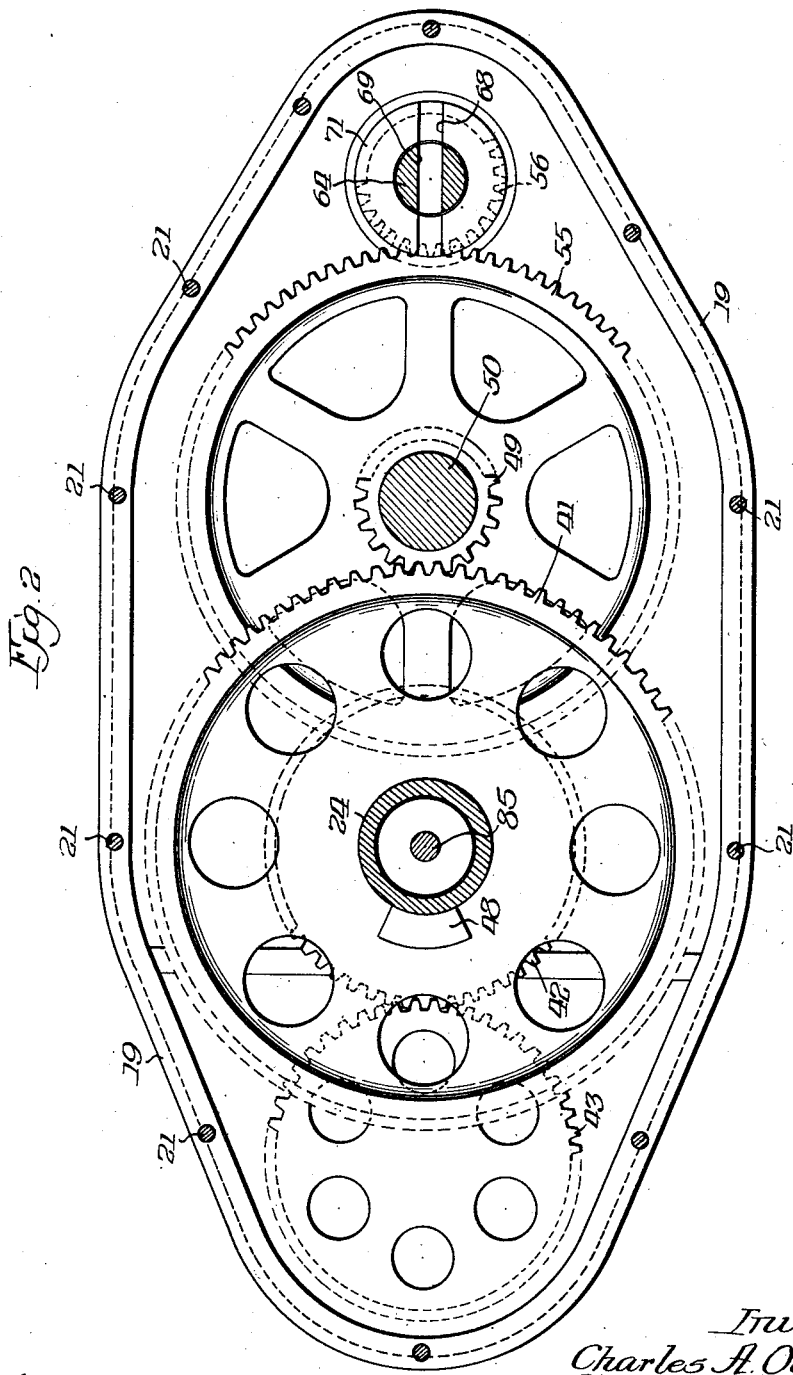

Nov. 19, 1929.  C. A. OLSON ET AL  1,736,417
MOTOR OPERATED VALVE UNIT
Filed Nov. 14, 1927   3 Sheets-Sheet 3
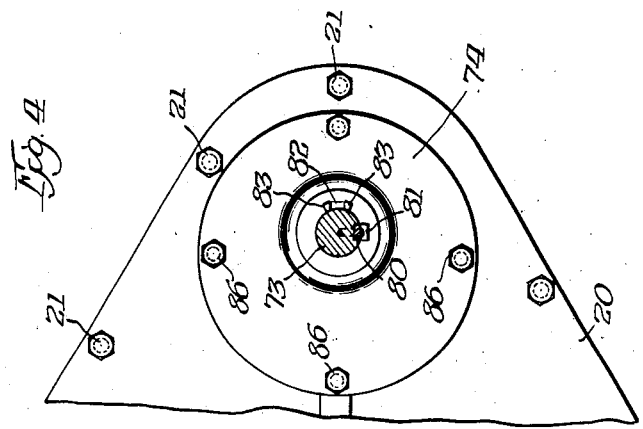
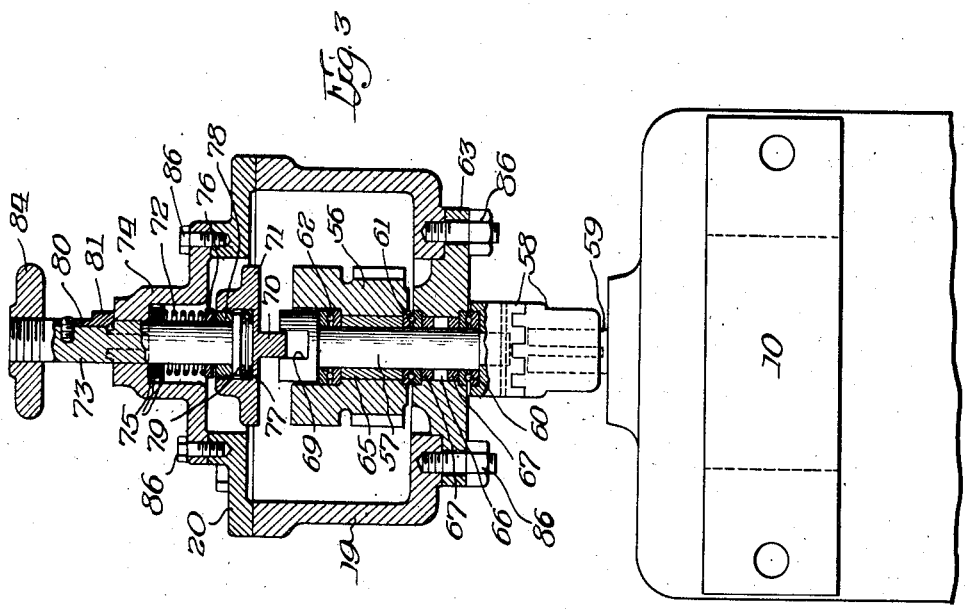
Inventors:
Charles A. Olson
Clinton H. Beckwith
By Ira Wilson
Atty.
Witness:

Patented Nov. 19, 1929

1,736,417

UNITED STATES PATENT OFFICE

CHARLES A. OLSON AND CLINTON H. BECKWITH, OF GENEVA, ILLINOIS, ASSIGNORS TO CRANE CO., OF CHICAGO, ILLINOIS, A CORPORATION OF ILLINOIS

MOTOR-OPERATED VALVE UNIT

Application filed November 14, 1927. Serial No. 232,994.

The invention hereinafter disclosed pertains to a power mechanism or unit and more particularly to motor driven power units for operating gate valves and the like.

Where gate valves of large size are designed to control fluids under high pressure or where the valves are in an inaccessible or remote place, it becomes advisable, if not necessary, to provide power mechanism for opening and closing them. Ordinarily such valves are provided with a yoke or standard integrally or otherwise connected with the valve body or bonnet for guidance or support of the stem of the valve, the transmission mechanism, the motor, and a limit switch, the motor and limit switch being mounted on lugs integrally formed on the valve body. The yoke or standard, casting or forging, is difficult and expensive to manufacture when the lugs, projections, or plate on and against which the motor or limit switch is to be mounted and secured, are cast integral therewith. Casting a motor mounting plate or lugs on the body or bonnet of the valve is likewise costly and objectionable. Furthermore, it often becomes necessary or desirable to install a motor operated gate valve in a cramped place or the like where, owing to the relative position of the motor mounting lugs or plate on the yoke or standard or body with respect to the position in which the standard or bonnet or body must be disposed in the line, a special casting or forging of body, bonnet, standard or yoke adapted to such position must be provided. In other words, assuming that the line in which the valve is to be installed closely parallels a wall and that the motor mounting plate or lugs be so cast on the yoke or standard or body that the motor must be placed transversely of the line on the side toward the wall and there is insufficient clearance to permit this to be done, then it becomes necessary either to incline the valve and its operating mechanism away from the perpendicular to some unsatisfactory position, or to cut out the wall or to cut away the wall or to re-position or offset the line.

One of the primary objects of our invention is to provide a motor mounting device, in the embodiment to be described shown as a plate on which the valve yoke or stem may be mounted, which together with the transmission mechanism may be adjusted to or moved about to locate them in any circumferential position with respect to the valve body or line so as to avoid predicaments such as that above noted for illustrative purposes.

Power transmission mechanism of the character specified has heretofore been very expensive to manufacture, assemble, install, disassemble, repair and replace, because of unnecessary complication of parts and arrangement which apparently were never considered as susceptible of simplification and because it has been deemed necessasy to provide a motor mounting device integral with the yoke or standard or other parts of the valve structure.

We have devised a power transmission construction comparatively simple and cheap to manufacture, and easy to assemble for installation or disassemble for repair or replacement, yet strong, efficient, and effective for its purpose. Such is another principal object of our invention.

Another object of the invention is to provide a novel and particularly effective clutch or transmission engaging and disengaging device whereby the prime mover or motor may quickly be connected to or disconnected from the valve operating mechanism and to provide means whereby the clutch parts may be locked in disengaged position.

A further object is to provide a novel construction whereby the valve may be started from its seat by a heavy initial impact or hammer blow commonly known as a "knockout."

Many further objects, including provision of a quick detachable and insertable yoke sleeve bushing and its mounting, a compact gear transmission in a totally inclosing gear case and a combined gear and clutch element, as well as the functions, advantages and uses of the invention and its several parts, should be or will become readily appreciated after reading the following description and claims and after viewing the drawings in which:

Fig. 1 is a vertical section through a transmission construction embodying one form of the invention, parts being broken away where necessary for the purpose of showing other parts on a larger scale, Fig. 2 is a transverse sectional view taken on the line 2—2 of Fig. 1, Fig. 3 is a sectional elevation taken on the line 3—3 of Fig. 1 through the clutch mechanism, and Fig. 4 is a view taken on the line 4—4 of Fig. 1.

In the embodiment and application of the invention illustrated, the valve body or bonnet is provided with a yoke or standard generally designated 2, the top portion 3 of which is preferably substantially circular and provided with a concentric circular flange 4. The center portion of the part 3 is bored out for passage of a threaded valve stem 5 and a circumferential concentric positioning shoulder 6 surrounds the bore through which the stem projects and serves to lock or position a motor mounting plate generally designated 7 which has a counterbored central portion adapted to be received over the valve stem and over the circumferential shoulder 6 and be positioned thereby. At one side of the plate 7, which for most of its external perimeter may be of any desirable shape, an arm 8 depends and is formed with one or more bosses 9 against and to which a motor or prime mover 10 is secured. In the present illustration, both the arm or leg 8 and a leg 11, to which a limit switch or the like 12 may be suitably secured, depend from the plate at right angles thereto and are integrally forged, cast, welded or otherwise formed on the plate, preferably depending upon the manner in which the plate itself is formed.

The mounting plate is centrally bored sufficiently wide to receive a part 13 of a stem actuating member 14 which is in threaded engagement with stem 5, and a thrust bearing 15 between its bore and the external cylindrical wall of the part 13. Bolts 16 passing through openings in the yoke flange 4 and preferably equally spaced from one another around the axis of the stem serve to secure the mounting plate and the transmission casing 17 in place together, the lower end of the casing 17 being provided with a circumferential projection, boss or shoulder 18 adapted to snugly fit a counterbored positioning recess in the top of the plate 7. With this construction it will be noted that after dismounting the motor and limit switch or even after merely disconnecting them and removing the bolts 16, the mounting plate may be removed for the purpose of getting at the bearing 15 or for any other purpose. It will also be noted that the transmission casing and mounting plate, motor and limit switch may be moved to any one of a predetermined number of circumferential positions with respect to the yoke 2, or the valve body as the case may be.

The gear inclosing casing generally designated 17 is composed of two primary parts, a lower part 19 which is generally of cup shape and a top part or cap 20 which is suitably secured to the lower part 19 by machine screws or the like 21. The casing parts 19 and 20 are provided with concentric openings 22 and 23 forming a passage-way through which a yoke sleeve bushing 24 is extended. The lower end of the passage-way through the casing, that is the end adjacent the yoke 2, is counterbored, as shown at 25, and the plate 7 is likewise counterbored to receive a circumferential flange portion 26 on the yoke sleeve bushing 24 with a reasonable amount of clearance between them. The sleeve 24 is adapted to be keyed by keys 27 or splined to the stem operating member 14 for rotation therewith before or after the operating member is threadedly engaged with the threads on the stem whereupon it is inserted in the passageway from the lower end thereof and positioned in the passage-way by a shoulder 28 which engages a thrust bearing 29 interposed between it and a shoulder 30 formed in the wall of the passage-way.

At its upper end, the sleeve is keyed as by keys 31 to a bushing 32 between which and an upstanding circumferential flange 33 formed on the top of the casing cap 20 a radial bearing 34 is interposed. The bearing 34 is held in place by a ring 35 secured to the flange 33 and machine screws 36 and by the hub 37 of a hand wheel 38 threadedly engaged as shown at 39 with similar threads formed on the bushing 32 and locked in place by a set screw 40. From the foregoing, it will be apparent that rotation of the hand wheel 38 by hand or otherwise will rotate the sleeve 24, and the stem actuating member 14 to cause the stem to rise or fall depending upon the direction of rotation of the hand wheel.

Mounted on the sleeve 24 within the casing, for relative movement with respect to the sleeve between predetermined positions, is a gear 41 to which in turn a small gear 42, meshing with a larger gear 43 having a pintle or hub 44 rotatably journaled in the casing and operatively connected with the drive screw 45 of the limit switch 12, is suitably secured as by screws 46. The bushing 32 is provided with a knock-out lug 47 adapted to contact with a cooperative knock-out lug 48 which may be formed integral with the gear 41 in order that after a predetermined extent of rotation of the gear, the lugs will contact with a hammer-like blow to start the valve away from its seat. Continued engagement of the lugs, of course, will effect the raising or lowering of the valve and valve stem as the case may be.

The gear 41 is adapted to be driven through certain reducing gearing and clutch mechanism by the motor 10 and to such end meshes with a gear 49, in this instance made integral with the shaft 50 journaled in bearings 51 and 52 provided in the top and bottom parts of the casing respectively. Suitable cover caps 53 and 54 exclude dust and prevent oil leakage and are secured to the top and bottom parts of the casing over the radial bearings 51 and 52 and hold them in place, the arrangement being such that the stub shaft may be removed very easily for inspection and repair.

Keyed on the stub shaft 50 is a large gear 55 which at all times meshes with a combined pinion and clutch 56 rotatably mounted on what we will term a drive shaft 57 in turn connected by clutch parts 58 with the motor armature shaft 59. Suitable bearings 60, 61 and 62 are interposed respectively between one of the clutch members 58 and an eccentric cover cap 63, between the eccentric cover cap 63 and the gear 56, and between the gear 56 and a head 64, formed on the shaft 57. A journal bushing 65 is placed between the combined gear and clutch member 56 and the drive shaft 57, while packing 66 and packing rings 67 are placed in the bore of the eccentric cap 63 to prevent oil leakage and to restrain dirt from entering the internal bearings.

The combined clutch and gear member 56 has a diametric slot 68 in its upper end, the top of which slot lies a reasonable distance below the top of a diametric slot 69 formed in the upper face of the head 64 of the drive shaft 57 and when these slots are in alignment, a tongue 70 formed on a rotatable clutch member 71 is adapted to enter them and connect the parts together. The tongue 70, however, is preferably arranged to engage within the slot 69 at all times so that when the drive shaft 57 is rotated, the clutch member 71 will rotate therewith regardless of whether or not the tongue is engaged in the slot 68 in the combined gear and clutch member 56.

Under normal conditions, the clutch member 71 is urged downwardly to engage the tongue 70 in the slot 68 under the influence of a compression spring 72 which surrounds a hand operable plunger 73 rotatably and reciprocally mounted in an eccentric cap 74 removably secured over an opening in the top of the casing. At one end, the spring abuts against washers having interposed packing, all generally designated 75, and at its other end against a collar 76 pinned or otherwise secured to the plunger 73, while the plunger is journaled in the clutch member 71 on a thrust bearing 77 and held therein by a ring bushing 78 which engages a second collar 79 secured to the plunger 73. In this manner the clutch member 71 may rotate freely on the lower end of the plunger 73. Since the spring would tend to keep the clutch parts engaged at all times, a safety mechanism for locking the plunger and clutch part 71 in inoperative position is provided. This consists of a key 80 secured in a slot in the plunger 73 and a projection 81 on the key adapted to pass down through the eccentric cap 74 in a slot 82 provided between two lugs 83 upstanding from the top surface of the cap.

When the plunger is raised by the handle 84 the key projection 81 is raised out of the slot 82 and turned to the right or left beyond a projection 83 and dropped therebehind. Any tendency toward rotation of the plunger will be prevented by interengagement of the projection 81 with one of the projections 83 and when the projection 81 is dropped down into the slot 82, its engagement with the walls of the slot will likewise prevent any rotation of the plunger.

A novel and outstanding feature of the invention providing a number of advantages lies in the eccentric cover or bearing cap arrangement whereby gear ratios between the motor or prime mover and the main gear or gear train may be varied. As will be understood from Figs. 1 and 4 the eccentric caps are arranged so that each may be secured to the gear casing with a line through the center of curvature of its periphery and the axial centers of the openings in the caps through which the plunger 73 and shaft 57 respectively pass, in any radial position with respect to the centers of the round openings in the casing they close. For this purpose each cap may have arcuate slots for reception of bolts and cap screws 86, or, if desired, a plurality of series of bolt holes may be located in the casing cover 20 so that the eccentric caps 63 and 74 may be adjusted in proper registering position with respect to each other depending upon the size of pinion 56 used.

With such an arrangement, it is but a simple matter to insert the proper size of pinion to give the gear ratio desired. In order, however, to maintain coupled engagement between the motor shaft and shaft 57, various "take-up" shims for insertion between the motor and the portion 8 of the mounting plate 7 may be provided, or different plates 7 may themselves be substituted or, if the limit switch is not mounted in the mounting plate but only secured to and suspended from the casing 17, the plate may be arranged for circumferential adjustment as previously described.

In order to determine the position of the valve at any time with relation to open, partially open, or fully closed positions, gauge bar 85 is suitably secured in or to the top of the valve stem and projects through the hollow interior of the sleeve 84 to a place where it may be read adjacent the hub of the handwheel 38.

From the foregoing description, it will be appreciated that the motor may be disconnected, if for any reason it should so become desirable, and the valve raised or lowered by hand, and it will also be appreciated that either the limit switch or the motor need not be connected to the plate 7, although it may be desirable so to arrange them, for either may be connected directly in the old and well known manner to lugs formed on the valve yoke or body. However, the arrangement of the plate 7 and its associated mechanism is very useful for the purpose above specified, as well as for many other purposes, which should be obvious, and for such reason wherever in the claims we have referred to the plate as a "motor mounting plate or the like", it should be understood we do not, except where the context otherwise requires, intend to be limited to a motor such as an electric motor per se. Within our meaning, the word "motor" is to be construed to mean any kind of power transforming and transmitting element or apparatus such as an electric or other motor, a limit switch, etc. It is believed that the operation of the mechanism as a whole, the functions of the parts, and arrangement and construction as well as the uses and purposes of the invention will be fully appreciated from the foregoing and likewise appreciated that the invention is of such scope that we should not be limited to the illustrated embodiment but only by its spirit and the scope of the appended claims.

We claim:

1. A motor mounting device for motor operated valves comprising a plate having a portion adapted to extend across the top of the valve yoke and to be swung around thereon about the valve stem to a plurality of radial positions with respect to the yoke and having a portion depending therefrom adapted to have a motor secured thereto, and means for securing said plate to said yoke in any one of said radial positions.

2. A motor mounting construction for motor operated valves comprising, a standard having an aperture for disposal of a valve stem therethrough, a plate having a portion seated upon the top of said standard and extending about a portion of said stem, a gear casing having a portion seated upon said portion of said plate, means common to said standard, plate portion and casing portion for securing them together, and means on said plate at one side of said standard for securing a motor thereto in operative relation with respect to gearing in said casing.

3. A motor mounting plate for a device of the character described comprising an angular plate having a portion adapted to be disposed on top of and across a standard rising from a valve body and adapted to be removably secured to said standard and a second portion integral with the first said portion and depending therefrom substantially at right angles thereto at a place where it will clear said standard providing a motor mounting base.

4. A power transmission mechanism for gate valves comprising, a standard, a bracket mounted on top of said standard, a casing mounted on said bracket, means at once securing said casing, bracket and standard together, power transmission elements in said casing, and a driving motor secured to said bracket and connected with said elements.

5. A power transmission mechanism for gate valves comprising, a standard, a valve operating stem passing upwardly through said standard, a casing mounted above and secured to said standard, a motor mounting bracket removably clamped by and between said standard and casing, means on said bracket for attachment of a motor thereto, and power transmitting elements in said casing operatively connected with said stem and adapted for connection to a motor mounted on and secured to said bracket.

6. In combination with a gate valve body having a standard thereon and a valve stem rising adjacent a top part of said standard, a gear casing mounted on said standard and about said stem, stem operating gearing in said casing, a motor mounting plate secured by and between said casing and standard, and a motor on said plate for operating connection with said gearing.

7. In a combination of the character described having a driving element and a driven gear element, means for connecting and disconnecting said elements comprising a shaft connected to said driving element, a gear rotatably mounted on said shaft and meshing with said gear element, a second shaft coaxial with the first said shaft, and means on the second said shaft engaged with the first said shaft for rotation therewith and selectively engageable with and disengageable from the said gear for driving the same.

8. In a combination of the character described having a driving element and a driven gear element, means for connecting and disconnecting said elements comprising a shaft connected to said driving element, a gear rotatably mounted on said shaft and meshing with said gear element, a second shaft coaxial with the first said shaft, means on the second said shaft engaged with the first said shaft for rotation therewith and selectively engageable with and disengageable from the said gear for driving the same, and means for moving said means on the second said shaft into engagement with said gear.

9. In a combination of the character described having a driving element and a driven gear element, means for connecting and disconnecting said elements comprising a shaft connected to said driving element, a gear rotatably mounted on said shaft and meshing with said gear element, a second shaft coaxial with the first said shaft, means on the second said shaft engaged with the first said shaft for rotation therewith and selectively engageabble with and disengageable from the said gear for driving the same, and means for moving the second said shaft for moving said means thereon into engagement with said gear.

10. In a combination of the character described having a driving element and a driven gear element, means for connecting and disconnecting said elements comprising a shaft connected to said driving element, a gear rotatably mounted on said shaft and meshing with said gear element, a second shaft coaxial with the first said shaft, means on the second said shaft engaged with the first said shaft for rotation therewith and selectively engageable with and disengageable from the said gear for driving the same, means for moving the second said shaft for moving said means thereon into engagement with said gear, and means for securing the means on the second said shaft and said gear out of engagement with one another.

11. In a combination of the character described having a driving element and a driven gear element, means for connecting and disconnecting said elements comprising a shaft connected to said driving element, a gear rotatably mounted on said shaft and meshing with said gear element, a second shaft coaxial with the first said shaft, and means rotatably mounted on the second said shaft engaged with the first said shaft for rotation therewith and selectively engageable with and disengageable from the said gear for driving the same.

12. In a valve operating device of the character described, a driven gear mounted for rotation, a drive shaft mounted for rotation on an axis parallel the axis of rotation of said driven gear, a drive gear mounted adjacent one end of said drive shaft for rotation thereon and normally meshing with said driven gear, a plunger mounted in alignment with said drive shaft adjacent the end on which said drive gear is mounted and reciprocal toward and from such end of said shaft, a member mounted on said plunger for relative rotation about the axis thereof, and means on said member, drive shaft and drive gear for connecting them all together when said plunger is moved toward the said end of said drive shaft.

13. In a valve operating device of the character described, a driven gear mounted for rotation, a drive shaft mounted for rotation on an axis parallel the axis of rotation of said driven gear, a drive gear mounted adjacent one end of said drive shaft for rotation thereon and normally meshing with said driven gear, a plunger mounted in alignment with said drive shaft adjacent the end on which said drive gear is mounted and reciprocal toward and from such end of said shaft, a member mounted on said plunger for relative rotation about the axis thereof, means on said member, drive shaft and drive gear for connecting them all together when said plunger is moved toward the said end of said drive shaft, and means normally urging said plunger toward said shaft.

14. In a valve operating device of the character described, a driven gear mounted for rotation, a drive shaft mounted for rotation on an axis parallel the axis of rotation of said driven gear, a drive gear mounted adjacent one end of said drive shaft for rotation thereon and normally meshing with said driven gear, a plunger mounted in alignment with said drive shaft adjacent the end on which said drive gear is mounted and reciprocal toward and from such end of said shaft, a member mounted on said plunger for relative rotation about the axis thereof, means on said member, drive shaft and drive gear for connecting them all together when said plunger is moved toward the said end of said drive shaft, means normally urging said plunger toward said shaft, and means for locking said member in inoperative position.

In witness of the foregoing we affix our signatures.

CHARLES A. OLSON.
CLINTON H. BECKWITH.